July 9, 1963 J. C. MILLER 3,097,312

SHIFT REGISTER INCLUDING TWO TUNNEL DIODES PER STAGE

Filed Sept. 30, 1960 2 Sheets-Sheet 1

INVENTOR.
James C. Miller
BY [signature]
ATTORNEY

INVENTOR.
James C. Miller
BY
Carl V. Olson
ATTORNEY 3,097,312
Patented July 9, 1963

3,097,312

SHIFT REGISTER INCLUDING TWO TUNNEL DIODES PER STAGE

James C. Miller, Hamilton Square, N.J., assignor to Radio Corporation of America, a corporation of Delaware Filed Sept. 30, 1960, Ser. No. 59,692
7 Claims. (Cl. 307—88.5)

This invention relates to shift registers useful in electronic data processing apparatus, and more particularly to shift registers capable of very high speed operation by virtue of employing high speed negative resistance elements such as tunnel diodes.

Shift registers in electronic data processing apparatus consist of a chain of storage units each suitable for receiving and storing a binary "0" or a binary "1." The binary signals in the storage units are shifted one step along the chain when a shift pulse is applied to the register. Shift registers are used, for example, in the multiplication of two numbers in the conventional manner of summing the partial products. It is necessary to shift the accumulated partial product with respect to the new partial product before the two are summed.

A tunnel diode is a negative resistance element having a current-voltage characteristic including a low-voltage positive resistance region and a high-voltage positive resistance region separated by a negative resistance region. A tunnel diode can be biased so that it has two operating points. one in the low voltage positive resistance region and the other in the high voltage positive resistance region. The tunnel diode is thus useful in digital data processing apparatus because the low voltage state of the tunnel diode can represent a binary "0" signal, and the high voltage state can represent a binary "1" signal. A tunnel diode has an advantage over other two-state units in that it can be more rapidly switched from one of its states to the other in response to an input signal. For example, a tunnel diode can be switched from one state to another in a time period in the order of one nanosecond (i.e., $10^{-9}$ seconds).

It is a general object of this invention to provide an improved shift register capable of very high speed operation.

It is another object to provide an improved shift register utilizing the desirable characteristics of tunnel diodes.

It is a further object to provide an improved shift register that is economical of construction and reliable in operation.

In one aspect, the invention comprises a shift register constructed of a chain of bistable tunnel diode storage circuits which are individually biased to remain in either an initial "0" state or a switched "1" state. Each tunnel diode storage circuit is coupled to the next storage circuit in the chain by means of a unidirectional device, a shift tunnel diode and a second unidirectional device. Initially, input binary signals are applied to and stored in the tunnel diode storage circuits. A shift wave is applied to all of the shift tunnel diodes to bias them for a given interval at a level causing each shift tunnel diode to assume the state of the preceding tunnel diode storage circuit. A clear or reset signal is applied to all of the tunnel diode storage circuits during a portion of the given interval. The reset signal has an amplitude of one polarity sufficient to cause the storage circuits to return to the initial "0" state, and has a following amplitude of the opposite polarity sufficient to cause those storage circuits to assume the "1" state which follow shift diodes that are then in the "1" state. The binary information signal in each storage circuit is thus shifted through a shift diode to the next following storage circuit. A shift register according to the invention is capable of operation at speeds in excess of 100 megacycles per second.

These and other objects and aspects of the invention will be apparent to those skilled in the art from the following more detailed description taken in conjunction with the appended drawing wherein.

Figure 1:
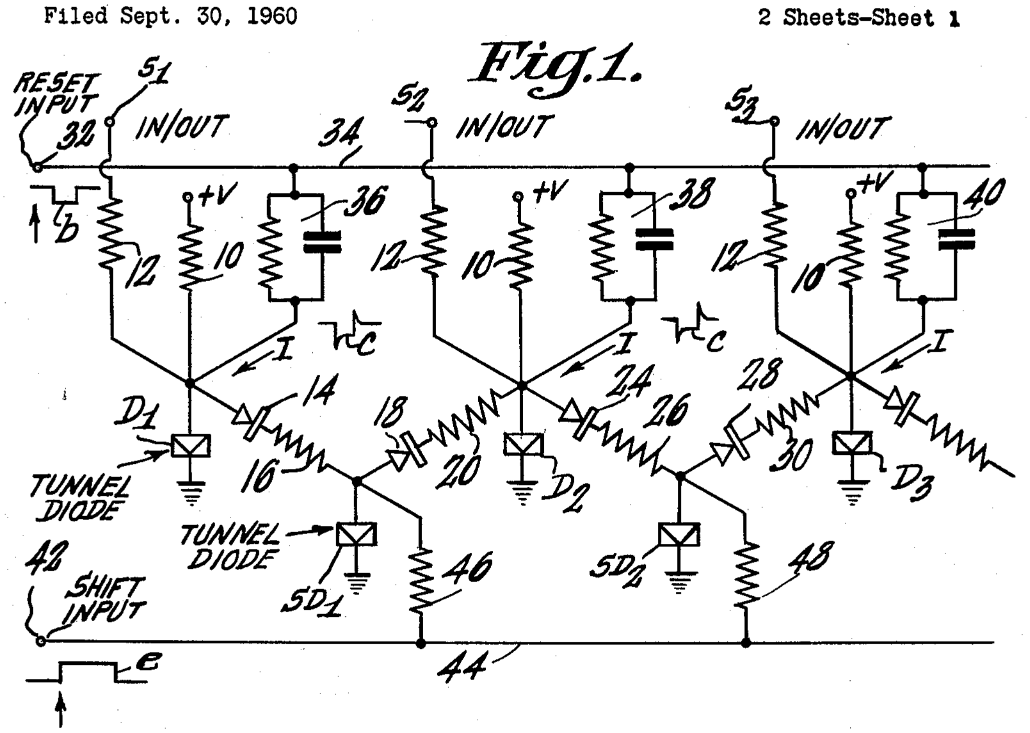
FIGURE 1 is a schematic diagram showing three storage sections of a shift register constructed according to the teachings of the invention.

The shift register shown in FIGURE 1 includes a number of storage tunnel diodes $D_1$, $D_2$ and $D_3$ coupled in a chain. Each of the storage tunnel diodes is biased through a resistor 10 from a source (not shown) having a +V terminal, to provide a bistable tunnel diode storage circuit. Binary input signals can be applied to the respective tunnel diode storage circuits from signal input terminals $S_1$, $S_2$ and $S_3$ through respective input resistors 12.

Storage diode $D_1$ is coupled to the storage diode $D_2$ by means of, in the order named, a unidirectional coupling diode 14, a coupling resistor 16, a shift diode $SD_1$, a unidirectional coupling diode 18 and a coupling resistor 20. The storage diode $D_2$ is coupled to the next storage diode $D_3$ in the chain by means of similar elements 24, 26 $SD_2$, 28 and 30.

A reset pulse terminal 32 is connected to a reset bus 34 which is coupled to the storage tunnel diodes $D_1$, $D_2$ and $D_3$ through respective reset coupling circuits 36, 38 and 40. Each reset coupling circuit consists of a resistor and a reactive element or capacitor connected in parallel. A shift pulse input terminal 42 is connected to a shift pulse bus 44 which is coupled to all of the shift tunnel diodes $SD_1$, $SD_2$ through respective coupling resistors 46, 48.

It will be understood that while FIGURE 1 shows three storage tunnel diodes $D_1$, $D_2$ and $D_3$, this is for the purpose of illustration, and a shift register constructed according to the invention may include any number of storage tunnel diodes coupled in a chain. The output of the last storage tunnel diode in the chain may be coupled back to the first storage tunnel diode in the chain, if desired. The binary input signal may consist of a plurality of binary signals which are simultaneously applied to respective storage diodes from signal input terminals $S_1$, $S_2$ and $S_3$. Alternatively, the binary input signal may consist of a plurality of binary information signals which occur serially in time and which are applied successively to the input terminal $S_1$ of the first storage diode $D_1$ in the chain. In this event, the serially applied binary information signal is shifted along the chain of storage diodes until one binary information signal is stored in each storage diode. The signal terminals $S_1$, $S_2$ and $S_3$ can serve as signal output terminals as well as signal input terminals.

In explaining the operation of the shift register of FIGURE 1, it will be assumed that a binary "1" signal (a pulse) is applied to signal input terminal $S_1$, and that binary "0" signals (the absence of a pulse) are applied to input terminals $S_2$ and $S_3$.

Figure 2:
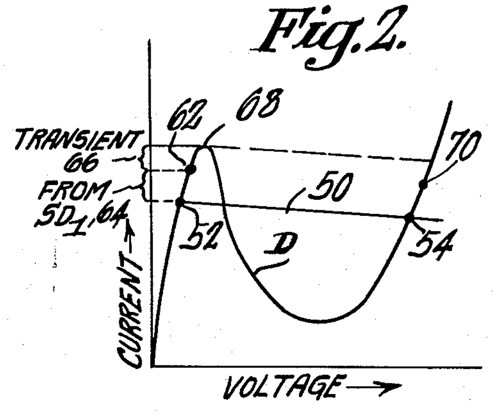
FIGURE 2 is a chart showing the current-voltage characteristic of the storage tunnel diodes in the circuit of FIGURE 1.
Figure 4:
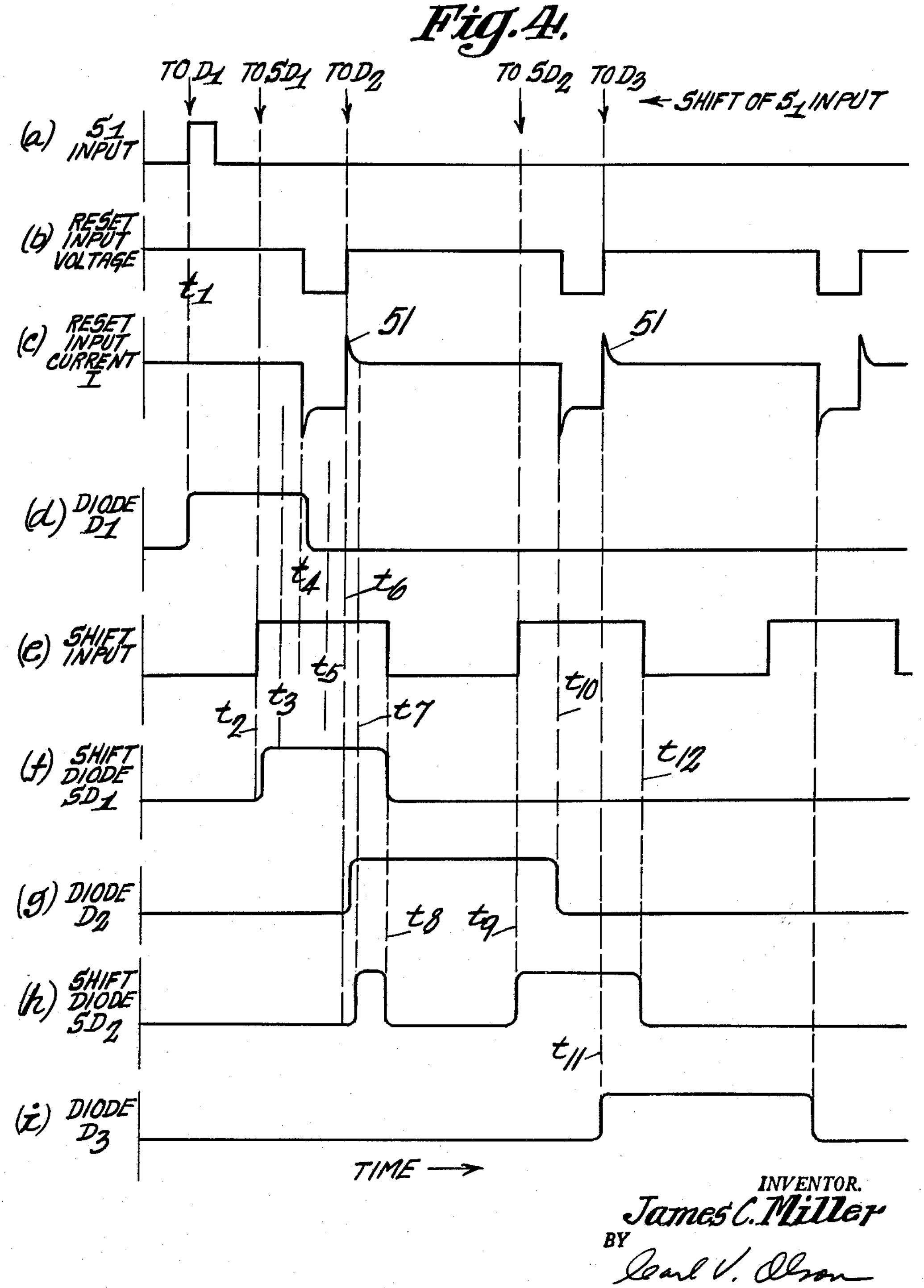
FIGURE 4 is a chart of waveforms which will be referred to in describing the operation of the shift register of FIGURE 1.

The storage tunnel diodes $D_1$, $D_2$ and $D_3$ are biased by the source +V to operate in a bistable manner as illustrated in FIGURE 2. The curve D represents the current-voltage characteristic of the storage diodes and the load line 50 intersects the curve D at points 52 and 54 to define the low voltage and high voltage stable operating points, respectively. When the binary "1" positive input pulse, as shown by waveform *a* at time $t_1$ in FIGURE 4, is applied to the signal input terminal $S_1$ in FIGURE 1, the storage diode $D_1$ switches from its low voltage quiescent operating point 52 to its high voltage operating point 54. The diode $D_1$, being in a bistable circuit, remains at the high voltage point 54 after the input pulse is removed, and the diode $D_1$ thus stores the binary "1" signal until such time as it may be reset. The voltage across the storage diode $D_1$ is represented by the waveform *d* in FIGURE 4.

Figure 3:
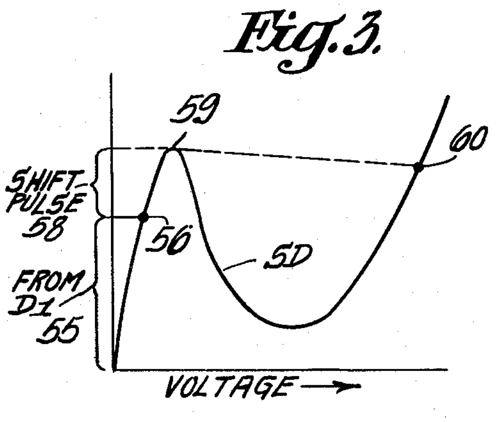
FIGURE 3 is a chart showing the current-voltage characteristic of the shift tunnel diodes in the circuit of FIGURE 1.

When the storage diode $D_1$ shifts to its high voltage state at time $t_1$, current flows from storage diode $D_1$ to shift diode $SD_1$ through the conduction diode 14 and the coupling resistor 16. This current (55 in FIGURE 3) causes the shift diode $SD_1$ to assume a low voltage operating point 56 on its characteristic curve. The shift diode $SD_1$ remains at the operating point 56 in the low voltage region of its characteristic curve until a time $t_2$ when a positive shift pulse is applied to it from the shift input terminal 42 via bus 44 and coupling resistor 46. The additional current 58 (FIGURE 3) supplied by the shift pulse causes the operating point of the shift diode $SD_1$ to switch from the low voltage point 56 up and over the peak 59 of the characteristic curve to a high voltage operating point 60 where it remains for the duration of the shift pulse. The waveform of the shift pulse is illustrated by curve *e* in FIGURE 4, and the voltage across the shift diodes $SD_1$ is illustrated by the curve *f* of FIGURE 4.

The stage of operation thus far reached (time $t_3$) is one wherein storage diode $D_1$ is in the high voltage state storing a binary "1," and shift diode $SD_1$ is also in the high state. The other storage and shift diodes are in low voltage states. The high voltage condition of the storage diode $D_1$ and the shift diode $SD_1$ causes a current flow through coupling diode 18 and resistor 20 to the storage diode $D_2$ at this time, but the current is not sufficient to switch storage diode $D_2$ to the high voltage state.

During an intermediate portion $t_4$–$t_6$ of the duration of the shift pulse *e*, a negative reset voltage pulse *b* is applied from the reset input terminal 32, the reset bus 34 and the respective reset coupling circuits 36, 38 and 40 to the storage diodes $D_1$, $D_2$ and $D_3$. The reset input voltage is also represented as the wave *b* in FIGURE 4. The reset current I flowing into each storage diode is illustrated by the waveform *c* in FIGURE 4. It will be noted that the current waveform differs from the voltage waveform in including negative transients or spikes at the leading edges of the pulses and positive transients or spikes 51 at the trailing edges of the pulses. This overshoot effect in the current waveform is produced by the presence of the parallel capacitors in each of the reset coupling circuits 36, 38 and 40. The current overshoot results from the fact that the capacitor presents a very low impedance to abrupt changes in voltage. As the capacitor gets charged up, it presents a very high impedance, and the current flow is determined by the impedance of the parallel resistor.

The reset pulse applied to the storage diode $D_1$ at time $t_4$ causes it to be returned from its high voltage state (54 in FIGURE 2) to its low voltage state 52. The reset pulse has no effect on storage diodes $D_2$ and $D_3$ because they were already in their low states. The condition of the shift register is now, at time $t$, such that the binary "1" is stored in the shift diode $SD_1$ and all the other diodes are in their low voltage states.

Following the trailing edge at time $t_6$ of the reset pulse applied to the storage diodes there is a positive transient overshoot current 51 which causes the storage diode $D_2$ to switch to the high state. The binary "1" in the shift diode $SD_1$ is thus shifted to the storage diode $D_2$. This action is clear from the chart of FIGURE 2, when the characteristic curve D is considered to represent the characteristic of the storage diode $D_2$. The storage diode $D_2$ has a low voltage operating point 52 due to the bias source $+V$. When the shift diode $SD_1$ is in the high voltage state, an additional current 64 is applied to the storage diode $D_2$ causing its operating point to move to the point 62, still in the low voltage region. However, the positive current transient overshoot 51 at the trailing edge of the reset pulse has a current magnitude 66 which is sufficient, when added to the other currents, to cause the operating point of the storage diode $D_2$ to exceed the current peak 68 and rapidly switch to an operating point such as the point 70. The storage diode $D_2$, being in a bistable circuit, remains in its high voltage state at the operating point 70 after the end of the transient current pulse, and remains at the high voltage operating point 54 after the shift diode $SD_1$ returns to its low voltage state at the end of the shift pulse applied thereto. The storage diode $D_2$ remains in the high voltage state at point 54 until the next following negative reset pulse is applied, at time $t_{10}$, to cause it to return to the low voltage operating point 52. The voltage across the storage diode $D_2$ is thus as illustrated by the curve *g* in FIGURE 4.

The description of the operation has proceeded to the time $t_7$ when the binary "1" input signal that was applied to the input terminal $S_1$ has been shifted from the storage diode $D_1$ through the shift diode $SD_1$ to the storage diode $D_2$. The "0" input signal (absence of a pulse) applied to input terminal $S_2$ has been shifted through the shift diode $SD_2$ to the storage diode $D_3$.

It can be seen by reference to wave *h* of FIGURE 4 that, at time $t_7$ following the positive transient at the end of the reset pulse, the shift diode $SD_2$ goes to the high state during the short period $t_7$–$t_8$ when the storage diode $D_2$ is in the high state and the positive shift pulse is present. This period $t_7$–$t_8$ during which the shift diode $D_2$ is in the high state serves no useful purpose, but causes no difficulty. The shift diode $SD_2$ does not cause the storage diode $D_3$ (curve *i*) to switch because, due to the delays in the system, the high state of the shift diode $SD_2$ follows at time $t_7$ (does not occur simultaneously with) the positive transient of the reset signal at time $t_6$.

The shift diode $SD_2$ again goes to the high state at time $t_9$ as a result of coincidence of the second shift pulse and the high state of storage diode $D_2$. Thereafter, the occurrence of the positive transient of the second reset pulse at time $t_{11}$ causes the binary "1" in shift diode $SD_2$ to transfer to the storage diode $D_3$ (curve *i* of FIGURE 4). At this time, following time $t_{11}$, the binary "1" signal originally applied to input terminal $S_1$ has been shifted through all the other diodes to storage diode $D_3$. The shift diode $SD_2$ is returned to the low state at time $t_{12}$ by the termination of the second positive shift pulse.

The intervals between negative reset pulses can be used for reading binary information into and out of the shift register through the terminals $S_1$, $S_2$ and $S_3$.

It will be understood that while the storage diodes have been described as having a fixed bias $+V$, this bias source can be dispensed with if the reset pulse wave is adjusted in direct current level to provide the desired positive voltage $+V$ in the intervals $t_6$–$t_{10}$ between negative reset pulses. Also, each shift diode may be provided with a positive direct current bias for the purpose of reducing the amount of current 55 (FIGURE 3) that needs to be supplied from the preceding storage diode.

It is thus apparent that according to the invention there is provided a novel and improved shift register capable of operation at very high speeds.

What is claimed is:

1. A shift register comprising a chain of bistable storage circuits which are stable in either an initial "0" state or a switched "1" state, a coupling from each storage circuit to the following storage circuit including unidirectional coupling means and a shift element having "0" and "1" states, means to apply a shift signal to bias all of said shift elements for a given interval at a level causing each shift element to assume the state of the preceding storage circuit, and means operative during said given interval to apply a reset signal to said storage circuits to cause them to return to the initial "0" state, and thereafter assume the state of the preceding shift element.

2. A shift register comprising a chain of bistable storage tunnel diode circuits biased to remain in either an intial "0" state or a switched "1" state, a coupling from each storage tunnel diode circuit to the following storage circuit including unidirectional coupling means and a shift tunnel diode, means to apply a shift signal to bias all of said shift tunnel diodes for a given interval at a level causing each shift tunnel diode to assume the state of the preceding storage tunnel diode circuit, and means operative during said given interval to apply a reset signal to said storage tunnel diodes to cause them to return to the initial "0" state, and thereafter assume the state of the preceding shift tunnel diode circuit.

3. A shift register comprising a chain of bistable storage tunnel diode circuits, biased to remain in either an initial "0" state or a switched "1" state, means to apply a binary input signal to at least one of said storage circuits of amplitude sufficient to cause the circuit to switch to the "1" state if the binary input signal is a "1," a coupling from each storage tunnel diode circuit to the following storage circuit including unidirectional coupling means and a shaft tunnel diode, means to apply a shift signal to bias all of said shift tunnel diodes for a given interval at a level causing each shift tunnel diode to assume the state of the preceding storage tunnel diode circuit, and means operative during said given interval to apply a reset signal to said storage tunnel diodes to cause them to return to the initial "0" state, and thereafter assume the state of the preceding shift tunnel diode circuit.

4. A shift register comprising a chain of bistable storage circuits which remain in either an initial "0" state or a switched "1" state, means to apply a binary input signal to at least one of said storage circuits of amplitude sufficient to cause the circuit to switch to the "1" state if the binary input signal is a "1," a coupling from each storage circuit to the following storage circuit including a first unidirectional coupling means, a shift element having "0" and "1" states, and a second unidirectional coupling means, means to apply a shift signal to bias all of said shift elements for a given interval at a level causing each shift element to assume the state of the preceding storage circuit, and means operative during said given interval to apply to said storage circuits a reset signal having an amplitude of one polarity sufficient to cause the storage circuits to return to the initial "0" state, and having a following amplitude of the opposite polarity sufficient to cause those storage circuits to assume the "1" state which follow shift elements that are in the "1" state, whereby the binary information signal in each storage circuit is shifted through a shift element to the next following storage circuit.

5. A shift register comprising a chain of negative resistance diode storage circuits having an initial "0" state and a switched "1" state, means to apply a binary input signal to at least one of said circuits of amplitude sufficient to cause the circuit to switch to the "1" state if the binary input signal is a "1," a coupling from each storage circuit to the following storage circuit including a first unidirectional coupling means, a negative resistance shift diode having "0" and "1" states and a second unidirectional coupling means, means to apply a shift signal to bias all of said shift diodes for a given interval at a level causing each shift diode to assume the state of the preceding storage diode circuit, and means operative during said given interval to apply to said storage diode circuits a reset signal having an amplitude of one polarity sufficient to cause the storage circuits to return to the initial "0" state and having a following amplitude of the opposite polarity sufficient to cause those storage circuits to assume the "1" state which follow shift diodes that are in the "1" state, whereby the binary information signal in each storage circuit is shifted through a shift diode to the next following storage circuit.

6. A shift register comprising a chain of bistable tunnel diode storage circuits biased to remain in either an initial "0" state or a switched "1" state, means to apply a binary input signal to at least one of said storage circuits of amplitude sufficient to cause the circuit to switch to the "1" state if the binary input signal is a "1," a coupling from each storage tunnel diode circuit to the following storage circuit including a first unidirectional coupling means, a shift tunnel diode and a second unidirectional coupling means, means to apply a shift signal to bias all of said shift tunnel diodes for a given interval at a level causing each shift tunnel diode to assume the state of the preceding storage tunnel diode circuit, and means operative during said given interval to apply to said storage tunnel diode circuits a reset signal having an amplitude of one polarity sufficient to cause the storage circuits to return to the initial "0" state, and having a following amplitude of the opposite polarity sufficient to cause those storage circuits to assume the "1" state which follow shift tunnel diodes that are in the "1" state, whereby the binary information signal in each storage tunnel diode circuit is shifted through a shift tunnel diode to the next following storage tunnel diode circuit.

7. A shift register comprising a chain of bistable tunnel diode storage circuits biased to remain in either an initial "0" state or a switched "1" state, means to apply a binary input signal to at least one of said storage circuits of amplitude sufficient to cause the circuit to switch to the "1" state if the binary input signal is a "1," a coupling from each storage tunnel diode circuit to the following storage circuit including a first unidirectional coupling means, a shift tunnel diode and a second unidirectional coupling means, means to apply a shift signal to bias all of said shift tunnel diodes for a given interval at a level causing each shift tunnel diode to assume the state of the preceding storage tunnel diode circuit, and means including reactive elements operative during said given interval to apply to said storage tunnel diode circuits a reset signal having an amplitude of one polarity sufficient to cause the storage circuits to return to the initial "0" state, and having a following amplitude of the opposite polarity sufficient to cause those storage circuits to assume the "1" state which follow shift tunnel diodes that are in the "1" state, whereby the binary information signal in each storage tunnel diode circuit is shifted through a shift tunnel diode to the next following storage tunnel diode circuit.

References Cited in the file of this patent

UNITED STATES PATENTS 2,785,390 Rajchman -------------- Mar. 12, 1957
2,907,898 Clark ----------------- Oct. 6, 1959

OTHER REFERENCES

"RC Coupled Tunnel Diode Shift Register," by Groudis, in IBM Technical Disclosure Bulletin, vol. 2, No. 6, April 1960, page 102.

"Applications of Tunnel Diodes," by Lewin, in 1960 International Solid State Circuits Conference Digest, Feb. 10, 1960, pages 10–11.